US012654613B2

(12) United States Patent
Vogel

(10) Patent No.: US 12,654,613 B2
(45) Date of Patent: Jun. 16, 2026

(54) CUSTOMIZABLE HEADLIGHT AND TAILLIGHT COVER SYSTEM

(71) Applicant: Channing Vogel, Prior Lake, MN (US)

(72) Inventor: Channing Vogel, Prior Lake, MN (US)

( * ) Notice: Subject to any disclaimer, the term of this patent is extended or adjusted under 35 U.S.C. 154(b) by 111 days.

(21) Appl. No.: 18/827,713

(22) Filed: Sep. 7, 2024

(65) Prior Publication Data

US 2026/0070484 A1 Mar. 12, 2026

(51) Int. Cl.
*B60Q 1/06* (2006.01)
*B60Q 1/30* (2006.01)
*H05B 47/19* (2020.01)

(52) U.S. Cl.
CPC ................ *B60Q 1/06* (2013.01); *B60Q 1/30* (2013.01); *H05B 47/19* (2020.01)

(58) Field of Classification Search
CPC ............. B60Q 1/06; B60Q 1/30; H05B 47/19
See application file for complete search history.

(56) References Cited

U.S. PATENT DOCUMENTS

2005/0218692 A1 * 10/2005 McNamee ............... B60J 11/00
296/136.07

2012/0134004 A1 * 5/2012 Melcher .................. G02F 1/155
977/932
2022/0063479 A1 * 3/2022 Alvarez .................... B60Q 1/04
2024/0085734 A1 * 3/2024 Kingman .......... G02F 1/133512

FOREIGN PATENT DOCUMENTS

CA 2509762 A1 * 1/2006 ............... B60R 1/06
JP 3245954 U * 3/2024

* cited by examiner

*Primary Examiner* — Abdullah A Riyami
*Assistant Examiner* — Syed M Kaiser
(74) *Attorney, Agent, or Firm* — The Iwashko Law Firm, PLLC; Lev Ivan Gabriel Iwashko

(57) ABSTRACT

A customizable headlight and taillight cover system to cover a headlight and a taillight of a vehicle, the customizable headlight and taillight cover system including a headlight cover to replace the headlight of the vehicle, the headlight cover including a plurality of headlight cover lights disposed on a surface of the headlight cover to illuminate based on a preference of a user, and a headlight cover central processing unit (CPU) to control illumination of the plurality of headlight cover lights, and a mobile device having a mobile application running thereupon to be wirelessly connected to the headlight cover CPU to allow the user to program the headlight cover CPU, such that the plurality of headlight cover lights are selectively illuminated based which of the plurality of headlight cover lights the user selects to be illuminated via the mobile device.

2 Claims, 2 Drawing Sheets

CUSTOMIZABLE HEADLIGHT AND TAILLIGHT COVER SYSTEM

BACKGROUND

1. Field

The present general inventive concept relates generally to a headlight and taillight cover system, and particularly, to a customizable headlight and taillight cover system.

2. Description of the Related Art

Criminals often rely on recognizable vehicle features to identify police presence, which can reduce the likelihood of law enforcement capturing potential criminals as their means of transport are so highly identifiable.

Beyond this niche segment, for those who seek to modify their own vehicle's appearance, adjustments and improvements can be incredibly costly and time-consuming.

Therefore, there is a need for a device that allows a user to transform the external appearance of a vehicle's lights.

SUMMARY

The present general inventive concept provides a customizable headlight and taillight cover system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a customizable headlight and taillight cover system, including a customizable headlight and taillight cover system to cover a headlight and a taillight of a vehicle, the customizable headlight and taillight cover system including a headlight cover to replace the headlight of the vehicle, the headlight cover including a plurality of headlight cover lights disposed on a surface of the headlight cover to illuminate based on a preference of a user, and a headlight cover central processing unit (CPU) to control illumination of the plurality of headlight cover lights, and a mobile device having a mobile application running thereupon to be wirelessly connected to the headlight cover CPU to allow the user to program the headlight cover CPU, such that the plurality of headlight cover lights are selectively illuminated based which of the plurality of headlight cover lights the user selects to be illuminated via the mobile device.

The customizable headlight and taillight cover system may further include a taillight cover to replace the taillight of the vehicle, the taillight cover including a plurality of taillight cover lights disposed on a surface of the taillight cover to illuminate based on a preference of the user, and a taillight cover central processing unit (CPU) to control illumination of the plurality of taillight cover lights, such that the mobile device having the mobile application running thereupon is wirelessly connected to the taillight cover CPU to allow the user to program the taillight cover CPU, such that the plurality of taillight cover lights are selectively illuminated based which of the plurality of taillight cover lights the user selects to be illuminated via the mobile device.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1A:
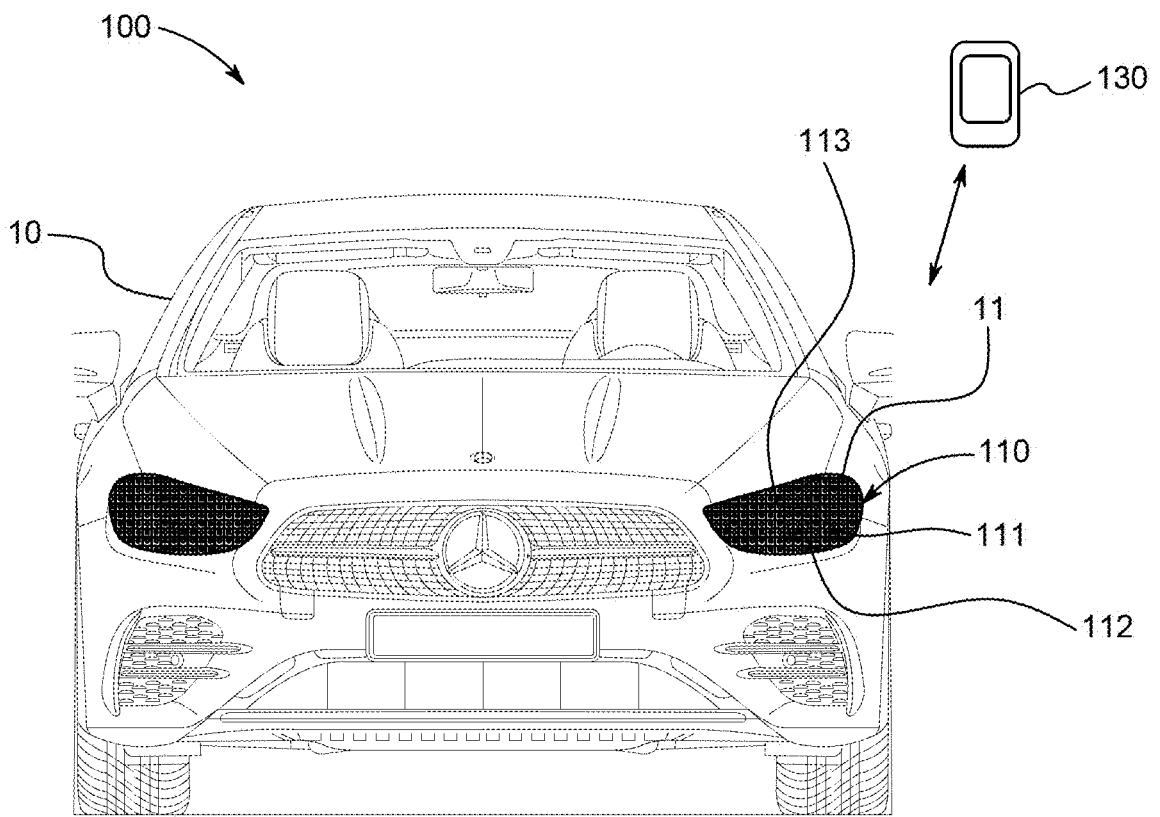
FIG. 1A illustrates a customizable headlight and taillight cover system installed on a front of a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle 10

Headlights 11

Taillights 12

Customizable Headlight and Taillight Cover System 100

Headlight Cover 110

Headlight Cover Lights 111

Headlight Cover Wiring 112

Headlight Cover Central Processing Unit 113

Taillight Cover 120

Headlight Cover Lights 121

Taillight Cover Wiring 122

Taillight Cover Central Processing Unit 123

Mobile Device 130

FIG. 1A illustrates a customizable headlight and taillight cover system 100 installed on a front of a vehicle 10, according to an exemplary embodiment of the present general inventive concept.

Figure 1B:
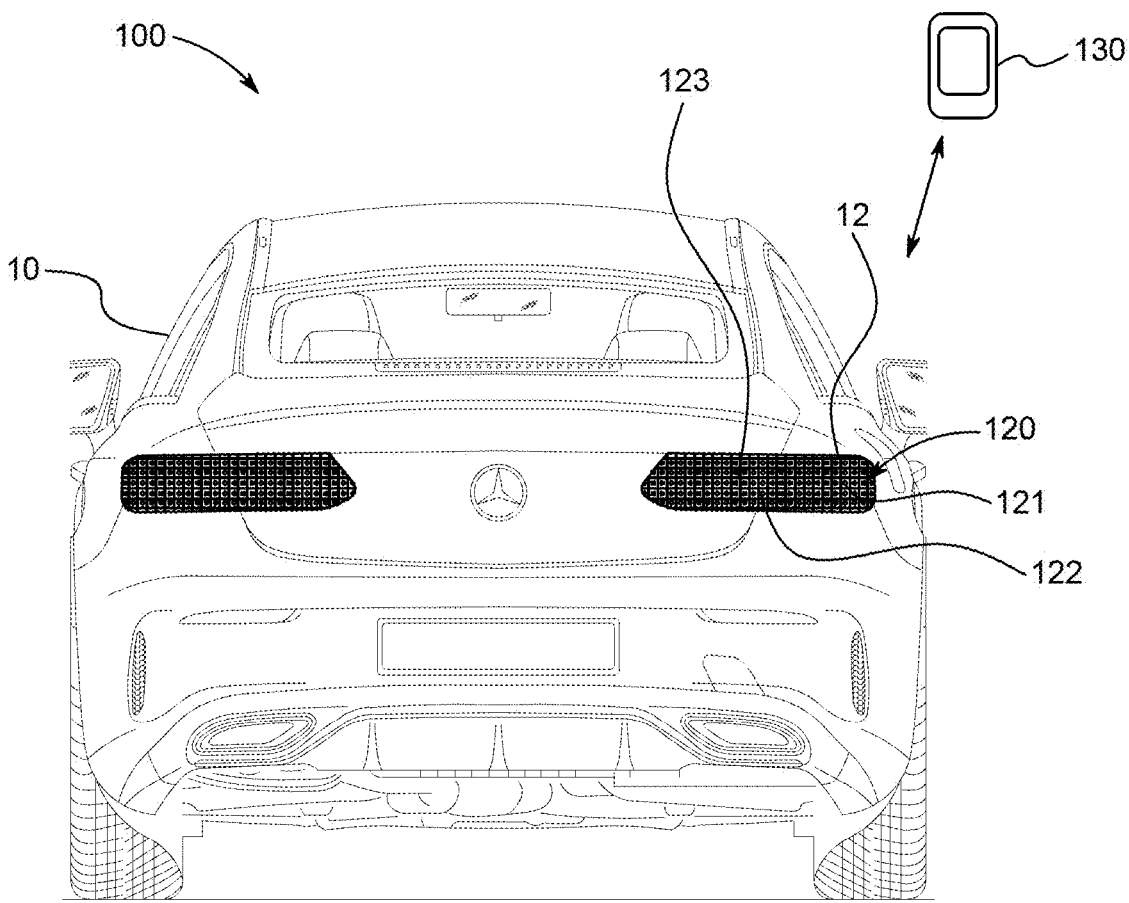
FIG. 1B illustrates the customizable headlight and taillight cover system installed on a back of the vehicle, according to an exemplary embodiment of the present general inventive concept.

FIG. 1B illustrates the customizable headlight and taillight cover system 100 installed on a back of the vehicle 10, according to an exemplary embodiment of the present general inventive concept.

The customizable headlight and taillight cover system 100 (which hereinafter may be referred to as simply the headlight and taillight cover system 100), and all components therein and/or connected thereto, may be constructed from at least one of metal, plastic, stone, ceramics, glass, wood, silicone, paper, cloth, circuitry, leather, memory foam, latex, and rubber, etc., but is not limited thereto, and can be constructed from any material known to one of ordinary skill in the art.

Referring to FIGS. 1A and 1B, the headlight and taillight cover system 100 may include a headlight cover 110, a taillight cover 120, and a mobile device 130, but is not limited thereto.

As illustrated in FIGS. 1A and 1B, a vehicle 10 may include a plurality of headlights 11 and a plurality of taillights 12 (i.e., typically, vehicles have two headlights and two taillights, but vehicles are not always limited thereto).

Referring to FIG. 1A, the headlight cover 110 may include a plurality of headlight cover lights 111, headlight cover wiring 112, and a headlight cover central processing unit (CPU) 113, but is not limited thereto.

The headlight cover 110 may be provided in plurality, and may be provided to be installed onto the headlights 11 of the vehicle 10, such that the headlight cover 110 may be electrically connected to a battery of the vehicle using the headlight cover wiring 112, such that the headlight cover wiring 112 may be connected to the same vehicle wiring to which the previous headlight 11 was connected. As such, the headlight cover 110 may be easily installed at the same area where the old headlight 11 was previously installed.

The plurality of headlight cover lights 111 may be light emitting diodes (LEDs), incandescent lights, or any other type of lights known to one of ordinary skill in the art. The plurality of headlight cover lights 111 may be dispersed throughout a surface of the headlight cover 110, and may be able to emit lights of various colors, including, but not limited to, white, yellow, red, orange, green, blue, purple, etc.

The headlight cover CPU 113 may be electronically connected to the plurality of headlight cover lights 111, and may control the plurality of headlight cover lights 111 to selectively emit light in a predetermined arrangement and/or with a predetermined color, based on a user's preference.

Specifically, the headlight cover CPU 113 may be programmed and/or controlled by a mobile device 130 (i.e., a mobile phone, a computer, a laptop, etc.), such that a mobile application (a.k.a., an "app") running on the mobile device

130 may allow a user to select which of the plurality of headlight cover lights 111 are illuminated, and what colors are illuminated.

The headlight cover CPU 113 may include electronic circuitry to carry out instructions of a computer program by performing basic arithmetic, logical, control and input/output (I/O) operations specified by the instructions. The headlight cover CPU 113 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The headlight cover CPU 113 may also include a microprocessor and a microcontroller. The headlight cover CPU 113 may be a local computer device, a remote server, or cloud computing device.

The headlight cover CPU 113 may also include a storage unit, a random access memory (RAM), a read-only memory (ROM), a hard disk, a flash drive, a database connected to the Internet, cloud-based storage, Internet-based storage, or any other type of storage unit.

The headlight cover CPU 113 may access the Internet via an internal communication unit to allow the headlight cover CPU 113 to access a website, and/or may allow for communication with a mobile application and/or a software application. For ease of description, the mobile and/or the software application will be hereinafter referred to as an app. The app may be downloaded from the Internet to be stored on the storage unit of the headlight cover CPU 113.

The headlight cover CPU 113 may also have a global positioning service (GPS) device installed therein, to allow the headlight cover CPU 113 to be located via a GPS signal. user to select which of the plurality of headlight cover lights 111 are illuminated, and what colors are illuminated.

Thus, the headlight cover CPU 113 may communicate with the mobile device 130, such that in response to the user selecting user which of the plurality of headlight cover lights 111 are illuminated (or what colors are illuminated), the headlight cover CPU 113 may control the plurality of headlight cover lights 111 to be illuminated based on the user's preferences.

As such, the plurality of headlight cover lights 111 may give an appearance to other drivers that a different type of vehicle is approaching, based on an apparent shape of the headlights that result from only selected lights of the plurality of headlight cover lights 111 being illuminated.

For example, if a particular vehicle typically has round headlights, the user can program the headlight cover CPU 113 to control the plurality of headlight cover lights 111 to only emit lights in a rectangular pattern, thus giving oncoming traffic an impression that a different type of vehicle approaching.

D

Referring to FIG. 1B, the taillight cover 120 may include a plurality of taillight cover lights 121, taillight cover wiring 122, and a taillight cover central processing unit (CPU) 123, but is not limited thereto.

The taillight cover 120 may be provided in plurality, and may be provided to be installed onto the taillights 12 of the vehicle 10, such that the taillight cover 120 may be electrically connected to a battery of the vehicle using the taillight cover wiring 122, such that the taillight cover wiring 122 may be connected to the same vehicle wiring to which the previous taillight 12 was connected. As such, the taillight cover 120 may be easily installed at the same area where the old taillight 12 was previously installed. The plurality of taillight cover lights 121 may be light emitting diodes (LEDs), incandescent lights, or any other type of lights known to one of ordinary skill in the art. The plurality of taillight cover lights 121 may be dispersed throughout a surface of the taillight cover 120, and may be able to emit lights of various colors, including, but not limited to, white, yellow, red, orange, green, blue, purple, etc.

The taillight cover CPU 123 may be electronically connected to the plurality of taillight cover lights 121, and may control the plurality of taillight cover lights 121 to selectively emit light in a predetermined arrangement and/or with a predetermined color, based on a user's preference.

Specifically, the taillight cover CPU 123 may be programmed and/or controlled by the mobile device 130 (i.e., a mobile phone, a computer, a laptop, etc.), such that a mobile application (a.k.a., an "app") running on the mobile device 130 may allow a user to select which of the plurality of taillight cover lights 121 are illuminated, and what colors are illuminated.

The taillight cover CPU 123 may include electronic circuitry to carry out instructions of a computer program by performing basic arithmetic, logical, control and input/output (I/O) operations specified by the instructions. The taillight cover CPU 123 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The taillight cover CPU 123 may also include a microprocessor and a microcontroller. The cover CPU 123 may be a local computer device, a remote server, or cloud computing device.

The taillight cover CPU 123 may also include a storage unit, a random access memory (RAM), a read-only memory (ROM), a hard disk, a flash drive, a database connected to the Internet, cloud-based storage, Internet-based storage, or any other type of storage unit.

The taillight cover CPU 123 may access the Internet via an internal communication unit to allow the taillight cover CPU 123 to access a website, and/or may allow for communication with a mobile application and/or a software application. For ease of description, the mobile and/or the software application will be hereinafter referred to as an app. The app may be downloaded from the Internet to be stored on the storage unit of the taillight cover CPU 123.

The taillight cover CPU 123 may also have a global positioning service (GPS) device installed therein, to allow the taillight cover CPU 123 to be located via a GPS signal, user to select which of the plurality of taillight cover lights 121 are illuminated, and what colors are illuminated.

Thus, the taillight cover CPU 123 may communicate with the mobile device 130, such that in response to the user selecting user which of the plurality of taillight cover lights 121 are illuminated (or what colors are illuminated), the taillight cover CPU 123 may control the plurality of taillight cover lights 121 to be illuminated based on the user's preferences.

As such, the plurality of taillight cover lights 121 may give an appearance to other drivers that a different type of vehicle is approaching, based on an apparent shape of the headlights that result from only selected lights of the plurality of taillight cover lights 121 being illuminated.

For example, if a particular vehicle typically has round headlights, the user can program the taillight cover CPU 123 to control the plurality of taillight cover lights 121 to only emit lights in a rectangular pattern, thus giving oncoming traffic an impression that a different type of vehicle approaching.

The present general inventive concept may include a customizable headlight and taillight cover system 100 to cover a headlight 11 and a taillight 12 of a vehicle 10, the customizable headlight and taillight cover system 100 including a headlight cover 110 to replace the headlight 11 of the vehicle 10, the headlight cover 110 including a plurality of headlight cover lights 111 disposed on a surface of the headlight cover 110 to illuminate based on a preference of a user, and a headlight cover central processing unit (CPU) 113 to control illumination of the plurality of headlight cover lights 111, and a mobile device 130 having a mobile application running thereupon to be wirelessly connected to the headlight cover CPU 113 to allow the user to program the headlight cover CPU 113, such that the plurality of headlight cover lights 111 are selectively illuminated based which of the plurality of headlight cover lights 111 the user selects to be illuminated via the mobile device 130.

The customizable headlight and taillight cover system 100 may further include a taillight cover 120 to replace the taillight 12 of the vehicle 10, the taillight cover 120 including a plurality of taillight cover lights 121 disposed on a surface of the taillight cover 120 to illuminate based on a preference of the user, and a taillight cover central processing unit (CPU) 123 to control illumination of the plurality of taillight cover lights 121, such that the mobile device 130 having the mobile application running thereupon is wirelessly connected to the taillight cover CPU 123 to allow the user to program the taillight cover CPU 123, such that the plurality of taillight cover lights 121 are selectively illuminated based which of the plurality of taillight cover lights 121 the user selects to be illuminated via the mobile device 130.

A main purpose of the present general inventive concept is to provide users with a cutting-edge modification for vehicles that allows users to transform the external appearance of a vehicle's lights. Ingenious and practical, the present general inventive concept offers a modern means for managing LED light aesthetics that permits officers to change their vehicle's appearance, regularly, to keep potential wrongdoers guessing; thereby, potentially reducing crime rates. The present general inventive concept introduces a novel car light cover that works in complement with a user-friendly control panel on the dashboard that is integrated with the vehicle's computer system or a mobile app. Upon installation, users can effortlessly modify the external look of their headlights and taillights through the app or dashboard with an interchangeable click-in LED light that controls the color and pattern of the light. For added convenience, the system also incorporates an automated variation feature allowing users to set predetermined schedules for the system to automatically change the appearance of the lights within twelve or six-hour cycles. This not only keeps the vehicle's aesthetics top tier but also serves as a practical solution for law enforcement agencies to alter how their primary car may appear as squad cars can change their light configurations, at whim, promoting unpredictability. This innovative, top-quality product enhances both the functionality and style of traditional lighting in vehicles and although it is targeted for police use it is practical for the everyday driver; thus, it may prove to be essential in the automotive industry.

The present general inventive concept is the only product of its kind that has the capability of completely modifying and altering a vehicle's headlights and taillights, at an owner's preference. This unprecedented product is uniquely designed to come in different shapes and sizes, is carefully crafted with durable, high-quality materials to ensure long-term sustainability, and is intended to offer direct manufacturing set-up or aftermarket upgrades, supporting any vehicle regardless of make or model.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A customizable headlight and taillight cover system to cover a headlight and a taillight of a vehicle, the customizable headlight and taillight cover system comprising:

a headlight cover to replace the headlight of the vehicle, the headlight cover comprising:

a plurality of headlight cover lights disposed on a surface of the headlight cover to illuminate based on a preference of a user, and a headlight cover central processing unit (CPU) to control illumination of the plurality of headlight cover lights; and a mobile device having a mobile application running thereupon to be wirelessly connected to the headlight cover CPU to allow the user to program the headlight cover CPU, such that the plurality of headlight cover lights are selectively illuminated based which of the plurality of headlight cover lights the user selects to be illuminated via the mobile device.

2. The customizable headlight and taillight cover system of claim 1, further comprising:

a taillight cover to replace the taillight of the vehicle, the taillight cover comprising:

a plurality of taillight cover lights disposed on a surface of the taillight cover to illuminate based on a preference of the user, and a taillight cover central processing unit (CPU) to control illumination of the plurality of taillight cover lights, such that the mobile device having the mobile application running thereupon is wirelessly connected to the taillight cover CPU to allow the user to program the taillight cover CPU, such that the plurality of taillight cover lights are selectively illuminated based which of the plurality of taillight cover lights the user selects to be illuminated via the mobile device.

* * * * *